July 26, 1966  G. FOELL ETAL  3,262,372
HYDRAULIC SPEED CONTROL APPARATUS

Filed March 16, 1965  3 Sheets-Sheet 1

Inventors
Gerhard Foell
Helmut Link
by Michael J. Striker

Inventors
Gerhard Foell
Helmut Link

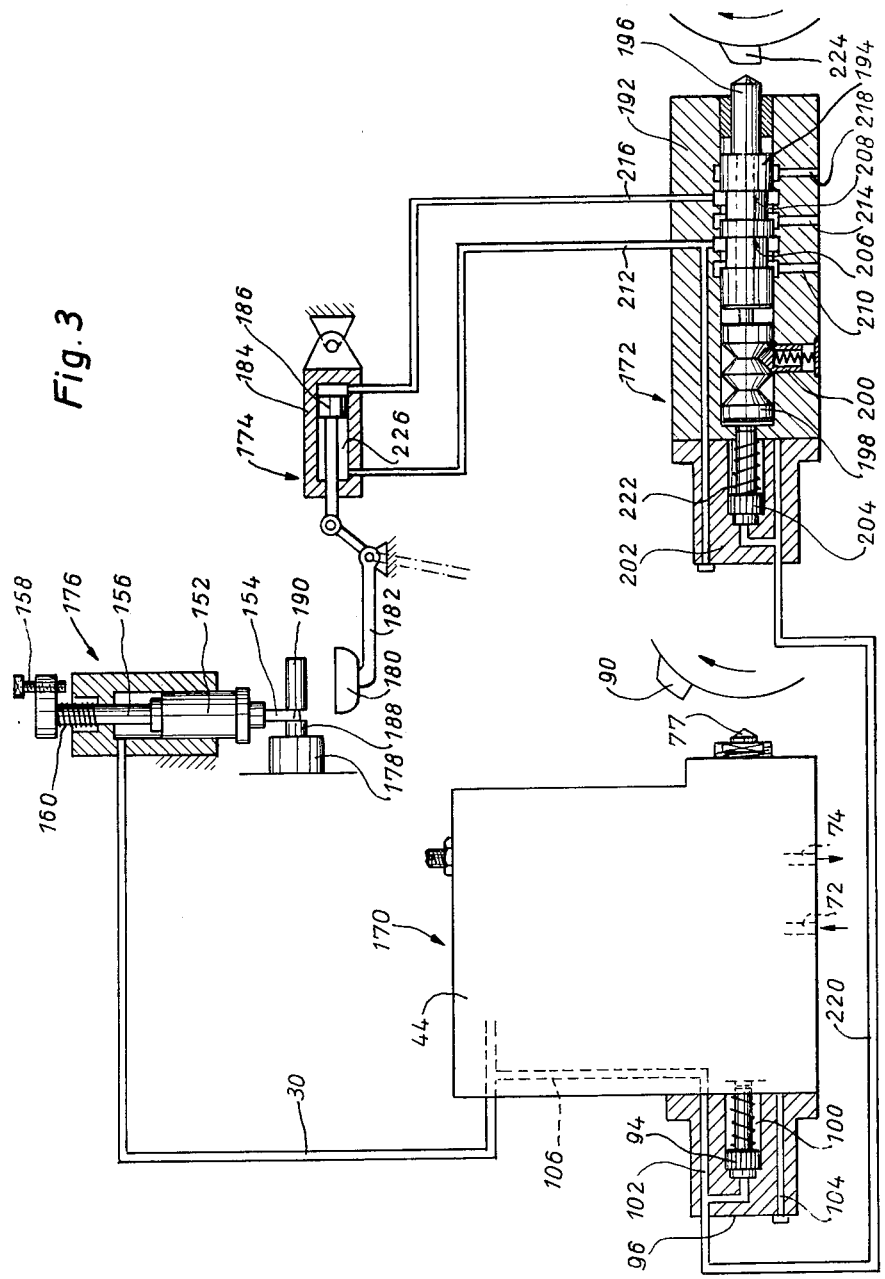

United States Patent Office 3,262,372
Patented July 26, 1966

3,262,372
HYDRAULIC SPEED CONTROL APPARATUS
Gerhard Foell and Helmut Link, both of Esslingen (Neckar), Germany, assignors to Index-Werke KG Hahn & Tessky, Esslingen (Neckar), Germany
Filed Mar. 16, 1965, Ser. No. 440,230
Claims priority, application Germany, Mar. 17, 1964, J 25,471
20 Claims. (Cl. 91—414)

The present invention relates to a hydraulic speed control apparatus for a machine tool, and more particularly to apparatus for moving machine elements such as carriages and tool holders, or workpieces, at a rapid speed during idle motions and at a slower speed during operations on a workpiece.

It is known to operate and control machine elements, particularly the holders or supports of tools or workpieces, by cams, electromechanical devices, and hydraulic apparatus.

If a cam control is used, a specific cam has to be designed for each desired feed motion. Since many cams are required, the control apparatus substantially increases the cost of the machine tool.

If electro-mechanical control apparatus is used, particularly for the movement of carriages, a regulating motor, or a gear transmission, is required for each control unit. However, electro-mechanical control apparatus permits an adjustment of the speed of the controlled element only in steps, and is also complicated and expensive.

Hydraulic and electro-hydraulic control apparatus requires cylinder and piston motors for each controlled element, and adjustable trip members for shifting hydraulic valves between positions for rapid traverse, operations on the workpiece, and rapid return of the respective machine elements.

It is an object of the present invention to improve known hydraulic control apparatus for machine tools, and to provide a hydraulic speed control apparatus of simple construction which can be used for different machine elements so that the same are exchangeable.

Another object of the invention is to provide a hydraulic speed control apparatus for a machine tool which does not require an electro-mechanical device and specifically designed cams.

Another object of the invention is to provide a hydraulic speed control apparatus for a machine element, such as a carriage, tool holder, or workpiece holder, permitting adjustments of the speed of movement of the controlled machine element, and of the length of the rapid advance stroke and of the working stroke of the machine element.

Another object of the invention is to obtain these adjustments by controlling the flow of fluid in the speed control apparatus.

With these objects in view, the present invention relates to a hydraulic speed control apparatus controlling a machine element of a machine tool, for example a carriage, a tool holder, or a workpiece holder. One embodiment of the invention comprises an operating unit including a fluid-operated member which controls the machine element; a control unit including a cylinder and a control piston forming in the same first and second control chambers, preferably adjustable stop means for limiting the stroke of the control piston, and inlet and outlet means for a fluid, preferably controlled by a cam actuated valve, and communicating with the first control chamber; first conduit means connecting the first control chamber with the operating unit, and preferably including closure means, such as a check valve, responsive to a predetermined pressure to open the first conduit means, and preferably adjustable means for limiting the rate of flow of fluid in the first conduit means so that the amount of fluid per second flowing through the first conduit means can be adjusted; and second conduit means connecting the second control chamber with the operating unit.

When fluid is supplied by the inlet means into the first control chamber upon actuation of the valve means by an actuating cam operating in synchronism with a machine tool, the control piston is rapidly moved so that fluid flows from the second control chamber through the second conduit means into the operating unit, and causes rapid advance of the controlled machine element, for example of a tool holder so that the tool rapidly approaches a workpiece.

When the control piston is stopped after a stroke of predetermined length determined by adjustment of stop means, the pressure of the fluid flowing into the first control chamber increases above the predetermined pressure at which the check valve in the first conduit means opens, so that fluid flows now through the first conduit means into the operating unit to move the controlled machine element. However, the speed of movement depends on the rate of flow through the second conduit means, and such rate of flow is limited, preferably by adjustable throttle means, so that the movement of the machine element is slower, and can be selected to correspond to the desired speed at which a particular operation is to be carried out by the tool.

The working fluid is supplied continuously and under pressure to the control unit, and its admission or discharge from the first control chamber takes place under the control of a valve means which is shifted in one direction by a rotary actuating cam to connect the inlet for the operating fluid with the first control chamber and which is shifted to another position in which the first control chamber is connected with the outlet for the fluid, by fluid-operated return means.

The fluid-operated return means is spring-loaded, and has a cylinder communicating with the second conduit means so that the piston of the return means is actuated against the action of the loading spring when an adjustable stop of the operating unit prevents further movement of the controlled machine element.

While in the preferred embodiment of the invention, the valve means is operated by a rotary cam, the control unit of the invention can also be manually operated by shifting the valve means. However, when several control units and operating units act on the same machine element for moving the same in two transverse directions, it is advantageous to operate each of the control units by actuating cam means operating in synchronism.

Since the adjustable throttling means in the first conduit means is gradually adjustable over a wide range, it is possible to gradually adjust the working speed of the controlled machine element.

A force accumulator, preferably in the form of a compression spring, is provided in the operating unit for returning the tool holder carrying piston to its initial position. During this movement, fluid is pressed into the second control chamber for returning the control piston to its initial position, while the second conduit means is closed by its check valve. Another check valve is provided for connecting the first and second control chambers of the control unit so that the returned fluid can flow into the outlet, bypassing the control piston. This check valve is preferably mounted in a passage in a control piston connecting the first and second control chambers.

A plurality of control units according to the invention can be combined to act on corresponding operating units to control, for example, two transverse movements of controlled machine elements. For example, one operating unit may control the speed of a longitudinally movable carriage, and the other control unit controls the speed of a carriage mounted for transverse movement on the first-mentioned carriage. For example, in a lathe, the carriage supporting the tool is first moved in transverse direction to its operative position, whereupon the other carriage is actuated to move the tool parallel to the axis of the rotating workpiece. Operations of this type are controlled by two control units according to the present invention. The arrangement is such that each operating unit controls the valve return means of the respective other control unit so that the two control units are sequentially operated depending on the actuation of the first operating unit.

In the modified arrangement of the invention, an additional valve means is actuated in synchronism with the operation of a control unit of the invention, and controls the movement of the operating piston by which another machine element is actuated to perform movements which are synchronized with the movements of the operating unit of the speed control apparatus of the invention.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompany drawings, in which:

FIG. 3 is a sectional, partially schematic view illustrating another modification of the invention.

Figure 1:
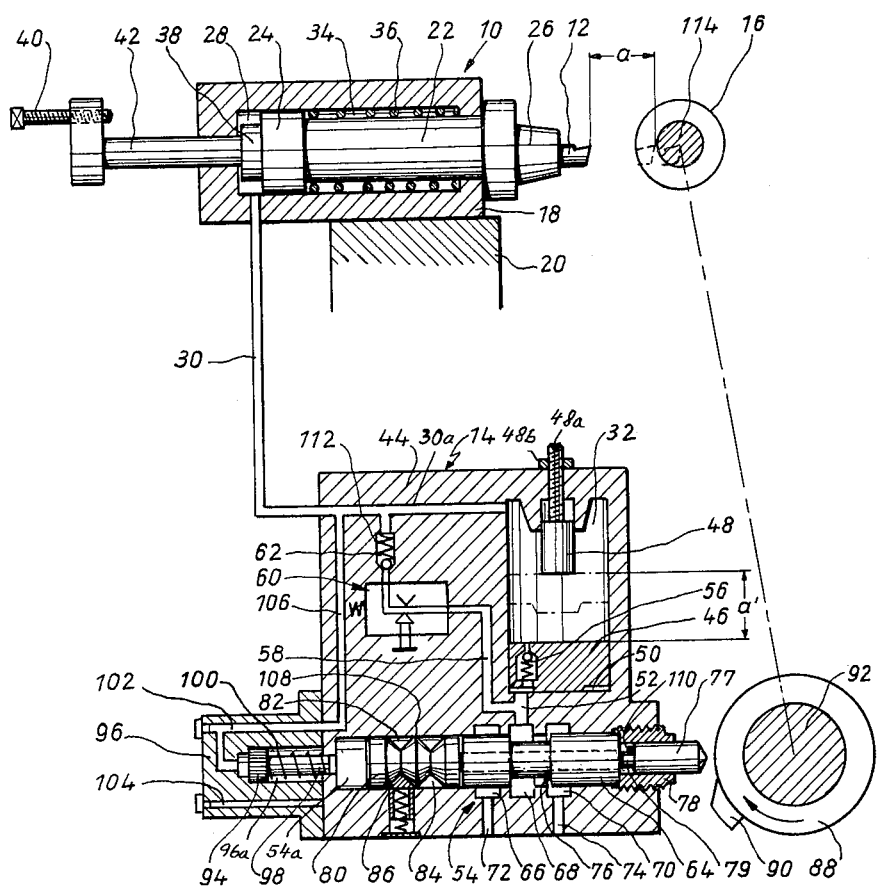
FIG. 1 is a sectional partially schematic view of one embodiment of a control apparatus according to the invention.

Referring now to the drawings, and more particularly to FIGURE 1, a hydraulic control apparatus is shown which is used for moving a tool 12 at different speeds during advance towards a workpiece 114 and during cutting the workpiece which is mounted on a rotary spindle 16 driven from the main shaft of the machine.

The apparatus includes an operating unit 10 and a control unit 14 which are connected by a conduit means 30. The control unit 12 is actuated by a rotary actuating means including a shaft 92 operating in synchronism with the operations of the machine tool, and a cam 88 with a cam projection 90.

The operating unit 10 includes a hydraulic cylinder 18 secured to a stationary frame part 20. A piston 24 is movable in the cylinder chamber 28 and has a piston rod 22 projecting out of cylinder 18 and carrying a tool holder 26 clamping a tool 12. A projection 38 on the other side of piston 24 carries a rod 42 with a flange on which an adjustable stop screw 40 is mounted. Stop screw 40 limits movement of piston 24 with tool 12 toward workpiece 114, and the distance of travel $a$ can be adjusted by turning stop screw 40. A coil spring 36 is located in cylinder 18 abutting the same and piston 24 to urge piston 24 away from workpiece 114.

Cylinder chamber 28 contains a working fluid, such as oil, so that piston 24 is moved to the right if fluid is admitted into chamber 28 through conduit 30, and moves to the left under the action of spring 36 when the pressure in the conduit 30 is relieved. Consequently, spring 36 acts as a force accumulator.

The control unit 14 has a main body or housing 44, a part of which forms a cylinder member with a cylinder chamber in which a control piston 46 is movable. Control piston 46 divides the cylinder chamber into a first control chamber 50 of annular configuration, and a second control chamber 32. A passage is provided in control piston 46 and connects the first control chamber 50 with the second control chamber 32. A spring-loaded check valve 56 permits flow of fluid only from control chamber 32 into control chamber 50.

The stroke of control piston 46 into the second control chamber 32 is limited by an adjustable stop means 48 which has a threaded spindle meshing with the corresponding threaded bore in the main body 44. The threaded spindle 48a is manually turned for adjusting the position of stop means 48, whereupon the adjusted position is secured by a counter nut 48b. A conduit portion 30a of conduit means 30 is formed in main body 44 and communicates with control chamber 32. Consequently when control piston 46 moves toward stop means 48, fluid will be displaced from control chamber 32 through conduit means 30 into chamber 28 of the operating unit 10, and cause movement of piston 24 with tool holder 26 and tool 12 toward workpiece 114 on work spindle 16. The movement of the tool is terminated when control piston 46 is stopped by stop means 48. By adjustment of the position of stop means 48, the moment at which no fluid is displaced through conduit means 30, and thereby the terminal position of tool 12, is determined.

The control unit 14 is provided with a valve means 54. Main body 44 has an inlet 72 and an outlet 74 for the operating fluid which respectively communicate with annular valve chambers 66 and 70. A third annular valve chamber 68 communicates with a passage 52 connected to the first control chamber 50. Annular chambers 66, 68, and 70 surround a cylindrical bore 54a in main body 44 in which a stepped cylindrical valve member 64 is mounted for longitudinal movement between two positions. A threaded plug 78 is screwed into a corresponding threaded bore in main body 44, and closes the cylindrical bore 54a. Valve body 64 has two outer portions having the same diameter as the cylindrical bore 54a, and a connecting portion of smaller diameter forming an annular chamber 76 in cylindrical bore 54a.

Shaft 92 which is driven from the main drive shaft of the machine tool carries actuating cam 88 with a projection 90 cooperating with a cam follower portion 77 which projects out of a bore of plug 78. Cam follower portion 77 is carried by rod 79 which passes through a bore in valve member 64 and has at the other end a shifting portion 80 provided with four frusto-conical faces forming a circular edge 108, and two annular recesses 82 and 84. A spring-loaded catch member 86 is biased toward the shifting portion 80, and is shown to be located in recess 82. When cam projection 90 engages follower portion 77, shifting portion 80 will be displaced so that catch 86 snaps into recess 84 over the circular edge 108 so that the slowly started movement of cam follower means 77, 79, 80 is rapidly continued due to the spring force of catch 86 until the catch is located in recess 84. Since valve member 64 is shifted by the cam follower means, it is rapidly shifted between two positions for establishing different connections for inlet means 72 and outlet means 74.

In the illustrated position, the inlet means 72 and annular chamber 66 are separated from annular chamber 68 which communicates with passage 52, and passage 52 and annular chamber 68 communicate through annular chamber 76 and annular chamber 70 with outlet 74.

In the shifted position of the valve, outlet 74 is disconnected from passage 52, and inlet 72 connected to the same by the communicating chambers 66, 76, and 68. Consequently, when the valve means is shifted out of the position illustrated in FIG. 1, fluid will flow through passage 52 into the first control chamber 50 and cause rapid movement of control piston 46 to its other end position abutting stop means 48 in the position illustrated in chain lines.

Passage 52 is connected to a second conduit means including a conduit portion 58 in main body 44, a throttling means 60 adjustable for limiting the amount of fluid flowing therethrough, and an automatic closure means in the form of a check valve 62 provided in a conduit portion connected to conduit portion 30a of conduit means 30. A spring 112 urges the ball of the check valve into the closing position and is dimensioned in such a manner that a predetermined fluid pressure is required for opening check valve 62 in a flow direction toward conduit 30, 30a.

A conduit 106 connects conduit portion 30a with a conduit 102 which communicates with a cylinder chamber 96a in a cylinder body 96 detachably secured to main body 44. A second conduit 104 in cylinder body 96 is not used in the embodiment of FIG. 1, but serves to establish other hydraulic connections in modified embodiments.

A return piston member 94 is mounted in cylinder chamber 96a and urged by spring 100 to the inoperative illustrated position in which piston 94 abuts a shoulder of cylinder body 96, and its piston rod 98 is spaced from the end face of shifting portion 80. When the pressure fluid enters conduits 106, 102 from conduit means 30, return piston 94 is displaced to the right as viewed in FIG. 1, and engages shifting portion 80 if cam follower means 77, 79, 80 is in the shifted position, not shown, in which catch 86 is located in the annular recess 84. Due to the movement of return piston 94 to the right, shifting portion 80 is shifted to the illustrated position together with valve body 64.

The control apparatus illustrated in FIG. 1 is operated in the following manner: All parts of operating unit 10 and of control unit 14 are in the illustrated initial position in which check valves 62 and 56 are closed, and the outlet 74 is connected with control chamber 50. Inlet 72 is connected with the pressure pipe of a hydraulic pump, not shown, and outlet 74 is connected to a discharge pipe, not shown, leading to a container from which the pressure pump pumps the hydraulic fluid.

When the suitably set cam projection 90 of the operating means 92, 88, which rotates in synchronism with the drive shaft of the machine tool, engages follower portion 77, cam follower means 77, 79, 80 is moved to the left so that catch 86 is pressed back until it passes over the circular edge 108 of shifting portion 80 whereupon the catch snaps into the recess 84, moving cam follower means 77, 78, 80 rapidly toward the left so that the shoulder 110 of follower portion 77 quickly throws valve body 64 from the illustrated position to its other position in which the left end face of valve body 64 abuts the right end face of shifting portion 80.

In this manner, the valve is rapidly shifted between its new position, irrespective of the slow movement of cam follower portion 90.

In the new position of valve member 64, inlet 72 and chamber 66 are connected by the annular chamber 76 of the valve member to annular chamber 68 and passage 52 so that pressure fluid supplied by the pump, not shown, passes into the first control chamber 50, moving control piston 46 in a rapid stroke toward stop means 48 which was previously adjusted to be spaced a distance $a'$ from the end face of piston 46. The pressure fluid flows through conduit portion 30a and conduit means 30 into cylinder chamber 28 and moves piston 24 to the right so that the tool 12 is moved by piston rod 22 and holder 26 toward the workpiece 114. As shown in FIG. 1, it is preferred to make the effective faces of control piston 46 and operating piston 24 of the same area, so that the distance $a$ which the tool travels is the same as the distance $a'$ which control piston 46 travels. In this manner, the travel of the tool can be determined by adjusting the stop means 48 for which purpose a scale, not shown, may be provided whose indications represent the distance of travel of the tool. The resistance offered by spring 36 is comparatively small, so that the pressure fluid rapidly moves control piston 46 while the same displaces operating piston 24 at the same high speed. Consequently, the tool 12 approaches workpiece 114 at the desired high speed.

The pressure in conduit 58 during the movement of control piston 46 is insufficient to open check valve 62 which is held in the closed position by spring 112 and will open only at a predetermined higher pressure.

When control piston 46 is stopped by stop means 48, and tool 12 is located in the correct position for starting a cutting operation on workpiece 114, the pressure builds up in control chamber 50 and conduit 58 until check valve 62 opens and permits fluid to flow from passage 52 through throttle means 60 which limits the rate of flow, check valve 62 and conduit means 30a, 30 into cylinder chamber 28.

Due to the fact that the flow is limited by the adjustable throttling means 60, the advance of operating piston 24 is not as fast as before, but takes place at a speed suitable for cutting workpiece 114. Such speed is determined by the amount of fluid flowing per second into cylinder chamber 28, and this rate of flow is determined by the adjustments of the throttling means 60, which is a valve of known construction.

By adjustment of throttling means 60, a gradual variation of the rate of flow, and of the speed of movement of operating piston 24 with tool 12 can be obtained, which is a considerable advantage as compared with constructions of the prior art where the working speed is only stepwise varied.

When piston 24 has moved at working speed to its end position determined by the adjustable stop screw 40, the fluid pumped through conduit 30 into operating chamber 28 can no longer enter the same, and the pressure increases in chamber 28, and in conduit 30, 106, and 102 so that the return piston 94 is subjected to a hydraulic force which overcomes the spring force of spring 100 which until the stopping of piston 24, was sufficient to maintain return piston 94 in the illustrated inoperative position. As the pressure increases, return piston 94 moves to the right together with piston rod 98 whose end face engages the left end face of shifting portion 80 and pushes the same to the right so that catch 86 is pressed out of annular recess 84, passes over edge 108 and snaps into recess 82 to hold the shifting member 80 in the illustrated position. Valve member 64 is shifted to the right to the illustrated position, and passage 52 is now connected through annular chambers 68, 76, and 70 to outlet 74. Consequently, the high pressure in chamber 28, conduits 30, 30a and control chamber 32 is no longer opposed by pressure in control chamber 50 so that spring 36 of operating unit 10 moves operating piston 24, together with tool 12, rapidly to the left to withdraw the tool from the workpiece. Fluid displaced from the cylinder chamber 28 is discharged through conduit means 30, 30a into control chamber 32 and rapidly moves control piston 46 to the illustrated position, while fluid is discharged through control chamber 50 through passage 52, chambers 68, 76, 70 and outlet 74. Since check valve 62 is closed by the pressure of fluid in conduit means 30, it prevents any flow of fluid into conduit 58, and all the fluid contained in chamber 28 must be discharged into control chamber 32. Since the volume of control chamber 32 corresponds only to the volume of cylinder chamber 28 in the position of piston 24 after the rapid advance and before the working movement of the tool, additional fluid enters control chamber 32 after control piston 46 has stopped in the illustrated position, and opens check valve 56 to flow into passage 52 and from there out of outlet 74. The force of spring 36 is sufficient to cause such a pressure on check valve 56 that the same opens.

The spring 100 of return piston 94 is also stronger than the spring of check valve 56 so that return piston 94 is pressed by spring 100 to the left, and fluid displaced from cylinder chamber 96 is discharged through conduit 102, 106, 30a, control chamber 32 and check valve 56 whose spring is weaker than spring 100. All parts of operating unit 10 and control unit 14 are now again in the initial position so that the actuation of cam follower portion 77 by cam projection 90 has resulted in rapid advance of the tool, in a cutting operation, and in a rapid return of the tool. Evidently, the corresponding operation of the tool can be obtained by manually shifting portion 77 to the left so that valve member 64 is shifted to its other position.

The threaded plug 78 permits an axial adjustment of valve member 64 in bore 54a. When valve member 64 is adjusted to a position in which a greater portion of annular chamber 70 communicates through annular chamber 76 with annular chamber 68, the fluid discharged through passage 52 can more rapidly flow out of outlet 74 than in the illustrated position. In this manner, the return speed of tool 12 can be adjusted, and the tool will be more rapidly retracted if a greater amount of fluid per second can flow through chambers 68, 76, 70 than if valve member 64 is in a position reducing the rate of flow along this path. When the discharge of fluid from outlet 74 is thus obstructed, the tool 12 will return with piston 24 at a lower speed corresponding to the working speed of the tool instead of at the higher speed which is used for advancing the tool to a working position.

Figure 2:
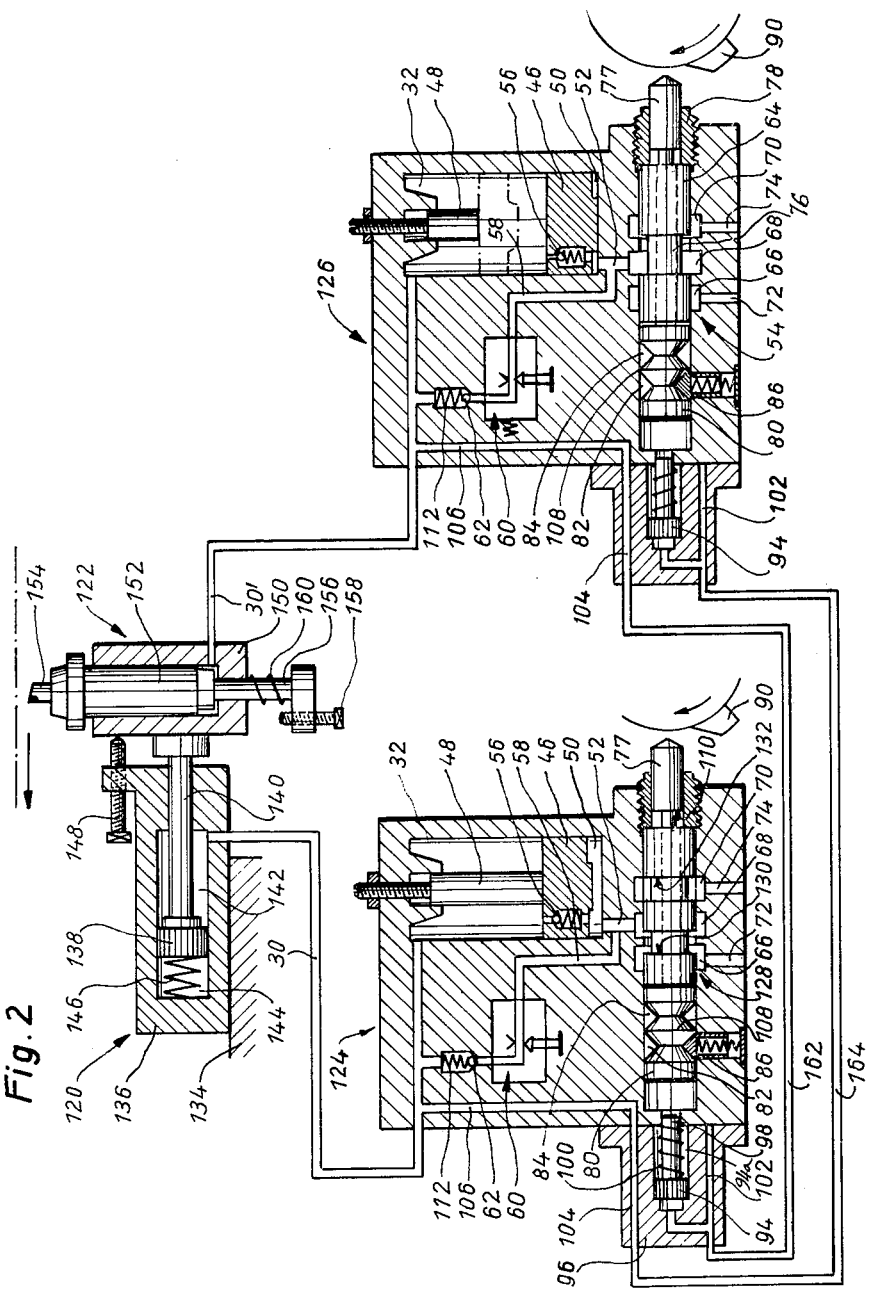
FIG. 2 is a sectional, partially schematic view, illustrating a modified control apparatus according to the invention.

In the embodiment of FIG. 2, two control units and two operating units are connected for sequential operation for the purpose of controlling the movement of a tool 154 in two transverse directions.

The control unit 126 is constructed as control unit 14 in the embodiment of FIG. 1, and like reference numerals indicate corresponding elements. The control unit 124 also substantially corresponds to the control unit 14 of FIG. 1, and corresponding parts are indicated by like reference numerals. The only modification of control unit 124 is found in valve member 128 which is provided with two annular recessed chambers 130 and 132 instead of the single annular recessed chamber 76 of control unit 14 and 126. When follower portion 77 of control unit 124 is actuated by cam projection 90, the first cylinder chamber 50 is connected with outlet 74 by the valve member of control unit 14, while valve member 128 connects in the illustrated initial position control chamber 50 and conduit 52 through chambers 68, 130 and 66 with the inlet 72. When the valve member is shifted, conduit 52 is connected through the annular recessed portion 132 and annular chamber 70 with outlet 74.

Conduit 102 of cylinder member 96 is connected by a conduit 162 to conduit 104 of cylinder member 96 of control unit 126 so that the cylinder 94a of cylinder member 96 communicates with the second conduit means 30' of control unit 126. On the other hand, cylinder 94a of control unit 126 and the corresponding conduit 102 are connected by a conduit 164 to conduit 104 of control unit 124 which communicates with conduit 106 and conduit means 30 of control unit 124.

A first operating unit 120 includes a cylinder 136 mounted on a stationary frame part 134 and having a cylinder chamber 144 in which a first operating piston 138 is mounted. A spring 146 urges piston 138 to move to the right as viewed in FIG. 2, and when pressure fluid is applied from control unit 124 through conduit means 30 into the cylinder chamber 142 on the other side of piston 138, the same is moved to the left as viewed in FIG. 2. A piston rod 140 connects piston 138 with the cylinder 150 of a second operating unit 122 so that the same can be shifted to the left and right under the control of piston 138. A second operating piston 152 is mounted in the cylinder 150 of the second operating unit 122, and carries a cutting tool 154. Conduit means 30' of the second control unit 126 communicate with the chamber formed in cylinder 150, and when pressure fluid is supplied through conduit means 30', piston 152 is advanced together with cutting tool 154 in a direction transverse to the direction of the movement of the operating unit 122 under the action of piston 138.

A rod 156 projects from operating piston 152 through a bore in cylinder 150, and carries a spring abutting cylinder 150 so that the piston is urged by spring 160 to move into the chamber of cylinder 150. A flange is secured to rod 156 and carries in a threaded bore, an adjustable stop screw cooperating with a face of cylinder 150, and a corresponding stop screw 148 is mounted on cylinder 136 of the first operating unit 120, and limits movement of cylinder 150 of operating unit 122 to the left as viewed in FIG. 2.

It is assumed that piston 138 moves the second operating unit 122 parallel to the axis of a rotary spindle in the head stock of a lathe, and parallel to the axis of a rotating workpiece, while operating piston 152 with tool 154 is movable in cylinder 150 in radial direction of the workpiece.

When follower 77 of control unit 124 is actuated by projection 90 of a cam which rotates in synchronism with the main drive shaft and main spindle of the lathe, valve means 128 is shifted as described with reference to FIG. 1, conduit 52 is connected to outlet 74, control piston 46 moves away from adjustable stop 48 and discharges fluid from control chamber 50 into the outlet 74, and the pressure in conduit 30 is reduced so that piston 138 is moved by spring 146 to the right together with the entire operating unit 122 whereby cutting tool 154 is placed in a position at the end of a workpiece and ready for a cutting operation. This movement is rapid, and only for a short distance, which is accomplished by a corresponding adjustment of stop means 48 which in the position illustrated for control unit 124 in FIG. 2, permits only a very short stroke of control piston 46.

Cam projection 90 of control unit 126 is set to engage at this moment follower 77 to shift valve member 64 of control unit 126.

Pressure fluid enters through inlet 72 and passes through chambers 66, 76 and 68 and through conduit 52 into control chamber 50 to move control piston 46 of control unit 126 rapidly toward stop 48 while fluid is displaced from control chamber 32 and passes through conduit 30' into the cylinder chamber of cylinder 150 so that operating piston 152 is rapidly advanced with cutting tool 154 until the same is placed in the correct working position for cutting the ends of the workpiece, not shown, to which it was moved by operating piston 138.

When control piston 46 of control unit 126 is stopped by the adjusted stop means 48, the pressure increases in control chamber 50, and conduits 52 and 58 so that check valve 62 opens and fluid flows into conduit 30'. The pressure increase in conduit 30' of control unit 126 is transmitted through conduits 104 and 162 to the cylinder 94a of return piston 94 of control unit 124 so that valve means 128 is shifted to the right as viewed in FIG. 2 to the illustrated position so that pressure fluid is supplied by inlet 72 through chambers 66, 130 and 68, and conduit 52 into control chamber 50 to move piston 46 so that fluid passes through conduit 30 of control unit 124 into cylinder space 142 and moves piston rod 38 to the left until cylinder 150 abuts stop screw 148. The corresponding movement of tool 154 takes place at a high speed, but when movement at a lower speed is desired, control piston 46 is pressed down by adjustment of stop means 48 so that it cannot be moved whereby all fluid passes through conduit 58, throttle means 60 and check valve 62 at the lower rate of flow into conduits 30 and chamber 142, causing movement of piston 138 to the left at the lower speed corresponding to the smaller amount of fluid per second entering chamber 142.

Irrespective of the speed of the movement of operating unit 122 to the left, the pressure in chamber 142 increases when piston 138 is stopped with cylinder 150 by adjustable stop 148 so that the increased pressure in conduit 30 of control unit 124 causes a corresponding pressure increase in conduit 164 and cylinder chamber 94a of control unit 126 so that return piston 96 is shifted to the right and displaces valve member 64 to the right to the position illustrated in FIG. 2 so that fluid is discharged from conduit 52 through outlet 74, causing a pressure drop in conduit 30' permitting spring 160 to retract piston 152 with cutting tool 154.

FIG. 3 illustrates another embodiment using the control and operating units of the invention. A control unit 170, corresponding to the control unit 14 described with reference to FIG. 1 is connected by conduit 30 to the chamber of a cylinder of an operating unit 176. A piston 152 carries a tool 154 for operating on a workpiece 190 carried by a rotary spindle 178. Operating unit 176 corresponds substantially to operating unit 122, and like reference numerals are used to indicate corresponding parts, including a return spring 160, and an adjustable stop 158. An additional operation unit 174 includes a cylinder 184, and a piston 186 forming two chambers in the cylinder 184. Piston 186 is connected with a lever means 182 for turning a tray 180 between a position located under the cutting tool 154, and an angularly displaced position indicated by chain lines for depositing a cutoff piece 190 of the workpiece 188 in a region spaced from the cutting tool. A valve means 172, substantially corresponding to the valve means 128 described with reference to FIG. 2 is provided. Valve means 172 includes a valve body 192, cam follower means 196 with a shifting portion 198 cooperating with a return piston 204. The valve member 194 has two annual recessed chambers 206 and 208. Five annular chambers surround the valve member and communicate, respectively with an inlet 210, and an outlet 214, another inlet 218, and two conduits 212 and 216 which are connected to the chambers on opposite sides of piston 186 formed in the cylinder chamber 226.

Conduit 30 and conduits 106 and 102 of control unit 107 communicate through a conduit 120 with the cylinder chamber of the return piston 204 of valve means 172. A rotary cam has a first projection 90 for operating cam follower means of the valve means of control unit 170, and another rotary cam has a projection 224 cooperating with follower portion 196 of the cam follower means 196, 198 of the valve means 172. A catch 200 holds the shiftable valve member 194 in two positions between which the valve member is shifted by a cam projection 124 or by return piston 204. In accordance with the position of valve member 194, either inlet means 210 is connected with conduit 212 and outlet means 214 is connected with conduit 216, or the connection is reversed and inlet means 210 communicates with conduit 216 while outlet means 214 communicates with conduit 212.

The pressure spring of return piston 94 of control unit 170 is stronger than the spring 222 of return piston 204 of valve means 172.

Cam projection 224 is set on the rotary cam means so that valve member 194 is shifted shortly before piston 152 of the operating unit 176 has been advanced by control unit 170 to a position in which the supplied blank rod 188 is cutoff by tool 154 so that the workpiece 190 is severed. When valve member 194 is shifted, fluid flows through inlet 210 into conduit 212 and the fluid entering the left cylinder chamber 226 moves piston 186 to the right as viewed in FIG. 3 so that the tray 180 is placed in the position illustrated in FIG. 3 under the workpiece 190. When the same is cutoff by a tool 154, it drops into tray 180 whereupon stop screw 158 abuts the cylinder of the operating unit 176 preventing further movement of piston 152 and causing the pressure to increase in conduit 30 of control unit 270 so that increased pressure in conduits 106, 102 and in the cylinder chamber of return piston 94 causes shifting of the valve of the control unit 170 to the right as will be understood with reference to FIG. 1, so that control chamber 50 is connected to the outlet, and the pressure of spring 116 is sufficient to return piston 152 while fluid is discharged from the operating unit 176 into conduit 30. Since both return pistons 204 and 94 are simultaneously operated by the increased pressure in conduit 30, 106 and 102 and 220, the valves are both placed in the initial position 30 for the next following operation.

It will be understood that each of the elements described above or two or more together, may also fined a useful application in other types of hydraulic speed control apparatus for machine tools differing from the types described above.

While the invention has been illustrated and described as embodied in a hydraulic speed control apparatus by which a tool is first moved at a higher speed for approaching a workpiece, and then moved at a gradually adjustable lower working speed, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed and desired to be secured by Letters Patent is:

1. In a machine tool, in combination, hydraulic speed control apparatus comprising an operating unit including a fluid-operated member adapted to be connected to a machine element; a control unit including a cylinder member, a piston member forming in the same first and second control chambers, one of said members being movable relative to the other member in a limited stroke and inlet means and outlet means for a fluid connected with said first control chamber; first conduit means connecting said first control chamber with said operating unit and limiting the rate of flow of fluid in said first conduit means; and second conduit means connecting said second control chamber with said operating unit so that fluid supplied by said inlet means into said first control chamber rapidly moves said movable member to press fluid from said second control chamber into said operating unit whereby said fluid operated member rapidly moves the machine element, while after stopping of said movable member after said limited stroke the pressure increases in said first conduit means so that fluid flows at a predetermined limited rate of flow into said operating unit to move said fluid operated member and said machine element at a predetermined low working speed.

2. In a machine tool, in combination, hydraulic speed control apparatus comprising an operating unit including a fluid-operated member adapted to be connected to a machine element; a control unit including a cylinder member, a piston member forming in the same first and second control chambers, one of said members being movable relative to the other member, stop means for limiting the stroke of said movable member into said second chamber, and inlet means and outlet means for a fluid connected with said first control chamber; first conduit means connecting said first control chamber with said operating unit and including closure means responsive to a predetermined pressure to open said first conduit means, and means for limiting the rate of flow of fluid in said first conduit means; and second conduit means connecting said second control chamber with said operating unit so that fluid supplied by said inlet means into said first control chamber rapidly moves said movable member to press fluid from said second control chamber into said operating unit whereby said fluid operated member rapidly moves the machine element, while after stopping of said movable member by said stop means the pressure increases in said first conduit means above said predetermined pressure so that fluid flows at a predetermined limited rate of flow into said operating unit to move said fluid operated member and said machine element at a predetermined low working speed.

3. In a machine tool, in combination, hydraulic speed control apparatus comprising an operating unit including a fluid-operated member adapted to be connected to a machine element, and biasing means for urging said fluid-operated member to an initial position against the action of fluid thereon; a control unit including a cylinder member, a piston member forming in the same first and second control chambers, one of said members being movable relative to the other member, stop means for limiting the stroke of said movable member into said second chamber, and inlet means and outlet means for a fluid connected with said first control chamber and including a check valve responsive to a selected pressure in said second control chamber to permit flow of fluid from said second control chamber into said first control chamber and out of said outlet means; first conduit means connecting said first control chamber with said operating unit and including closure means responsive to a predetermined pressure to open said first conduit means, and means for limiting the rate of flow of fluid in said first conduit means; and second conduit means connecting said second control chamber with said operating unit so that fluid supplied by said inlet means into said first control chamber rapidly moves said movable member to press fluid from said second control chamber into said operating unit whereby said fluid operated member rapidly moves the machine element while after stopping of said movable member by said stop means the pressure increases in said first conduit means above said predetermined pressure so that fluid flows at a predetermined limited rate of flow into said operating unit to move said fluid operated member and said machine element at a predetermined low working speed, the pressure produced by said fluid operated member moving to said initial position exceeding said selected pressure so that said check valve opens.

4. In a machine tool, in combination, hydraulic speed control apparatus comprising an operating unit including a fluid-operated member adapted to be connected to a machine element, and biasing means for urging said fluid-operated member to an initial position against the action of fluid thereon; a control unit including a cylinder member, a piston member forming in the same first and second control chambers, one of said members being movable relative to the other member, stop means for limiting the stroke of said movable member into said second chamber, and inlet means and outlet means for a fluid connected with said first control chamber, said piston member having a connecting passage connecting said first and second control chambers, and including a check valve responsive to a selected pressure in said second control chamber to permit flow of fluid from said second control chamber through said passage into said first control chamber and out of said outlet means; first conduit means connecting said first control chamber with said operating unit and including closure means responsive to a predetermined pressure to open said first conduit means, and means for limiting the rate of flow of fluid in said first conduit means; and second conduit means connecting said second control chamber with said operating unit so that fluid supplied by said inlet means into said first control chamber rapidly moves said movable member to press fluid from said second control chamber into said operating unit whereby said fluid operated member rapidly moves the machine element, while after stopping of said movable member by said stop means the pressure increases in said first conduit means above said predetermined pressure so that fluid flows at a predetermined limited rate of flow into said operating unit to move said fluid operated member and said machine element at a predetermined low working speed, the pressure produced by said fluid operated member moving to said initial position exceeding said selected pressure so that said check valve opens.

5. In a machine tool, in combination, hydraulic speed control apparatus comprising an operating unit including a fluid-operated member adapted to be connected to a machine element, biasing means for urging said fluid-operated member to an initial position against the action of fluid thereon, and an adjustable stop for stopping said fluid-operated member in an end position; a control unit including a cylinder member, a piston member forming in the same first and second control chambers, one of said members being movable relative to the other member, stop means for limiting the stroke of said movable member into said second chamber, inlet means and outlet means for a fluid, and valve means having two positions for respectively connecting said inlet means and outlet means with said first control chamber; first conduit means connecting said first control chamber with said operating unit and including closure means responsive to a predetermined pressure to open said first conduit means, and means for limiting the rate of flow of fluid in said first conduit means; and second conduit means connecting said second control chamber with said operating unit; actuating means for moving said valve means to one of said positions for connecting said inlet means with said first control chamber; and fluid-operated spring-biased return means connected with said second conduit means for returning said valve means to the other position connecting said outlet means with said first control chamber when the pressure increases in said operating unit beyond a given limit after said stop has stopped said fluid-operated member so that fluid supplied by said inlet means into said first control chamber rapidly moves said movable member to press fluid from said second control chamber into said operating unit whereby said fluid operated member rapidly moves the machine element, while after stopping of said movable member by said stop means the pressure increases in said first conduit means above said predetermined pressure so that fluid flows at a predetermined limited rate of flow into said operating unit to move said fluid operated member and said machine element at a predetermined low working speed until stopped by said stop.

6. A hydraulic apparatus as set forth in claim 5 wherein said actuating means includes a rotary cam, and a cam follower means operated by said cam and connected with said valve means; and wherein said return means includes a spring-loaded return piston biased to assume an inoperative position and responsive to fluid pressure in said second conduit means to move said cam follower means with said valve means.

7. A hydraulic apparatus as set forth in claim 6 wherein said valve means is a stepped cylindrical valve member, and wherein said cam follower means includes a follower portion at one end of said body and cooperating with said cam, a connecting rod passing in axial direction through said valve member, and a shifting portion located at the other end of said valve member remote from said follower portion and cooperating with said spring-loaded return piston, said shifting portion having slanted recesses; and including a spring-loaded catch member engaged biased into said recesses, and causing rapid snapping of said cam follower means between two positions for moving said valve means between said positions thereof after movement of said cam follower means has been initiated by said cam or by said return piston.

8. An apparatus as set forth in claim 5 and including means for adjusting said valve means for varying the rate of flow of fluid through said valve means and out of said outlet means whereby said biasing means return said fluid-operated member and said machine element at an adjustable speed.

9. In a machine tool, in combination, hydraulic speed control apparatus comprising an operating unit including a fluid-operated member adapted to be connected to a machine element; a control unit including a cylinder member, a piston member forming in the same first and second control chambers, one of said members being movable relative to the other member, stop means for limiting the stroke of said movable member into said second chamber, and inlet means and outlet means for a fluid connected with said first control chamber; first conduit means connecting said first control chamber with said operating unit and including a check valve responsive to a predetermined pressure to open said first conduit means for flow toward said operating unit, and means for limiting the rate of flow of fluid in said first conduit means; and second conduit means connecting said second control chamber with said operating unit so that fluid supplied by said inlet means into said first control chamber rapidly moves said movable member to press fluid from said second control chamber into said operating unit whereby said fluid operated member rapidly moves the machine element, while after stopping of said movable member by said stop means the pressure increases in said first conduit means above said predetermined pressure so that fluid flows at a predetermined limited rate of flow into said operating unit to move said fluid operated member and said machine element at a predetermined low working speed.

10. In a machine tool, in combination, hydraulic speed control apparatus comprising an operating unit including a fluid-operated member adapted to be connected to a machine element, biasing means for urging said fluid-operated member to an initial position against the action of fluid thereon, and an adjustable stop for stopping said fluid-operated member in an end position; a control unit including a cylinder member, a piston member forming in the same first and second control chambers, one of said members being movable relative to the other member, stop means for limiting the stroke of said movable member into said second chamber, inlet means and outlet means for a fluid, and valve means having two positions for respectively connecting said inlet means and outlet means with said first control chamber, said piston member having a passage connecting said first and second control chambers, and including a check valve responsive to a selected pressure in said second control chamber to permit flow of fluid from said second control chamber through said passage into said first control chamber and out of said outlet means; first conduit means connecting said first control chamber with said operating unit and including a check valve responsive to a predetermined pressure to open said first conduit means for flow toward said operating unit, and means for limiting the rate of flow of fluid in said first conduit means; second conduit means connecting said second control chamber with said operating unit; actuating means for moving said valve means to one of said positions for connecting said inlet means with said first control chamber; and fluid-operated spring-biased return means connected with said second conduit means for returning said valve means to the other position connecting said outlet means with said first control chamber when the pressure increases in said operating unit beyond a given limit after said stop has stopped said fluid-operated member so that fluid supplied by said inlet means into said first control chamber rapidly moves said movable member to press fluid from said second control chamber into said operating unit whereby said fluid operated member rapidly moves the machine element, while after stopping of said movable member by said stop means the pressure increases in said first conduit means above said predetermined pressure so that fluid flows at a predetermined limited rate of flow into said operating unit to move said fluid operated member and said machine element at a predetermined low working speed until stopped by said stop, the pressure produced by said fluid operated member moving to said initial position exceeding said selected pressure so that said check valve opens.

11. In a machine tool, in combination, hydraulic speed control apparatus comprising an operating unit including a fluid operated member, and a holder for a tool or workpiece carried by the same; a control unit including a cylinder member, a piston member forming in the same first and second control chambers, one of said members being movable relative to the other member, stop means for limiting the stroke of said movable member into said second chamber, and inlet means and outlet means for a fluid, and valve means for alternately connecting said inlet means and outlet means with said first control chamber; first conduit means connecting said first control chamber with said operating unit and including check valve means responsive to a predetermined pressure to open said first conduit means, and means for limiting the rate of flow of fluid in said first conduit means; and second conduit means connecting said second control chamber with said operating unit so that fluid supplied by said inlet means into said first control chamber rapidly moves said movable member to press fluid from said second control chamber into said operating unit whereby said fluid operated member and said holder rapidly move a workpiece or tool, while after stopping of said movable member by said stop means the pressure increases in said first conduit means above said predetermined pressure so that fluid flows at a predetermined limited rate of flow into said operating unit to move said fluid operated member and said holder with a workpiece or tool at a predetermined low working speed.

12. In a machine tool, in combination, hydraulic speed control apparatus comprising an operating unit including an operating cylinder, and a fluid-operated piston member in said cylinder adapted to be connected to a machine element to be moved at different speeds; a control unit including a cylinder chamber, a control piston movable in said cylinder chamber and forming in the same first and second control chambers, and adjustable stop means in said second control chamber for limiting the stroke of said control piston into said second chamber, inlet means and outlet means for fluid, and valve means having two positions for respectively connecting said inlet means and outlet means with said first control chamber; first conduit means connecting said first control chamber with said cylinder and including a spring-loaded check valve responsive to a predetermined pressure to open said first conduit means for flow toward said cylinder, and adjustable means for limiting the rate of flow of fluid in said first conduit means; and second conduit means connecting said second control chamber with said operating cylinder so that fluid supplied in a first position of said valve means into said first control chamber rapidly moves said control piston to press fluid from said second control chamber into said operating cylinder whereby said fluid operated piston member rapidly moves said machine element, while after stopping of said control piston by said stop means the pressure increases in said first conduit means above said predetermined pressure so that fluid flows at a predetermined rate of flow into said operating cylinder whereby said machine element is moved at a predetermined low working speed.

13. In a machine tool, in combination, hydraulic speed control apparatus comprising an operating unit including an operating cylinder, a fluid-operated piston member in said cylinder adapted to be connected to a machine element to be moved at different speeds, and spring means in said operating cylinder for urging said fluid-operated piston member to an initial position against the action of fluid thereon; a control unit including a cylinder chamber, a control piston movable in said cylinder chamber and forming in the same first and second control chambers, and adjustable stop means in said second control chamber for limiting the stroke of said control piston into said second chamber, inlet means and outlet means for fluid, and valve means having two positions for respectively connecting said inlet means and outlet means with said first control chamber, said control piston having a passage connecting said first and second control members and including another spring-loaded check valve responsive to a selected pressure in said control chamber to permit flow of fluid from said second control chamber through said passage into said first control chamber and out of said outlet means when said valve means connects said outlet means with said first control chamber; first conduit means connecting said first control chamber with said cylinder and including a spring-loaded check valve responsive to a predetermined pressure to open said first conduit means for flow toward said cylinder, and adjustable means for limiting the rate of flow of fluid in said first conduit means; and second conduit means connecting said second control chamber with said operating cylinder so that fluid supplied in a first position of said valve means into said first control chamber rapidly moves said control piston to press fluid from said second control chamber into said operating cylinder whereby said fluid operated piston member rapidly moves said machine element, while after stopping of said control piston by said stop means the pressure increases in said first conduit means above said predetermined pressure so that fluid flows at a predetermined rate of flow into said operating cylinder whereby said machine element is moved at a predetermined low working speed, said pressure produced by said spring means for moving said fluid-operated piston to said initial position exceeding said selected pressure so that said check valve in said control piston opens.

14. In a machine tool, in combination, hydraulic speed control apparatus comprising an operating unit including an operating cylinder, a fluid-operated piston member in said cylinder adapted to be connected to a machine element to be moved at different speeds, and spring means in said operating cylinder for urging said fluid-operated piston member to an initial position against the action of fluid thereon; a control unit including a cylinder chamber, a control piston movable in said cylinder chamber and forming in the same first and second control chambers, and adjustable stop means in said second control chamber for limiting the stroke of said control piston into said second chamber, inlet means and outlet means for fluid, and valve means having two positions for respectively connecting said inlet means and outlet means with said first control chamber, said control piston having a passage connecting said first and second control members and including another spring-loaded check valve responsive to a selected pressure in said second control chamber to permit flow of fluid from said second control chamber through said passage into said first control chamber and out of said outlet means when said valve means connects said outlet means with said first control chamber; actuating cam means rotating in synchonism with said machine tool for moving said valve means to one of said positions for connecting said inlet means with said first control chamber; fluid-operated return piston means connected with said second conduit means and operated by fluid for returning said valve means to the other position when the pressure increases in said operating cylinder beyond a given limit, and including a spring for restoring said return piston means to an initial position when fluid flows from said second conduit means through said second control chamber and said other check valve out of said outlet means; first conduit means connecting said first control chamber with said cylinder and including a spring-loaded check valve responsive to a predetermined pressure to open said first conduit means for flow toward said cylinder, and adjustable means for limiting the rate of flow of fluid in said first conduit means; and second conduit means connecting said second control chamber with said operating cylinder so that fluid supplied in a first position of said valve means into said first control chamber rapidly moves said control piston to press fluid from said second control chamber into said operating cylinder whereby said fluid operated piston member rapidly moves said machine element, while after stopping of said control piston by said stop means the pressure increases in said first conduit means above said predetermined pressure so that fluid flows at a predetermined rate of flow into said operating cylinder whereby said machine element is moved at a predetermined low working speed, said pressure produced by said spring means for moving said fluid-operated piston to said initial position exceeding said selected pressure so that said check valve in said control piston opens.

15. In a machine tool, in combination, hydraulic speed control apparatus comprising an operating unit including a cylinder, a fluid operated member in said cylinder, and a holder for a tool or workpiece carried by said member; a control piston movable in said cylinder chamber and forming in the same first and second control chambers, and adjustable stop means in said second control chamber for limiting the stroke of said control piston into said second chamber, inlet means and outlet means for fluid, and valve means having two positions for respectively connecting said inlet means and outlet means with said first control chamber; actuating means for moving said valve means between said positions; first conduit means connecting said first control chamber with said cylinder and including a spring-loaded check valve responsive to a predetermined pressure to open said first conduit means for flow toward said cylinder, and adjustable means for limiting the rate of flow of fluid in said first conduit means; and second conduit means connecting said second control chamber with said operating cylinder so that fluid supplied in a first position of said valve means into said first control chamber rapidly moves said control piston to press fluid from said second control chamber into said operating cylinder whereby said fluid operated member and said holder rapidly moves a tool or workpiece, while after stopping of said control piston by said stop means the pressure increases in said first conduit means above said predetermined pressure so that fluid flows at a predetermined rate of flow into said operating cylinder whereby said tool or workpiece is moved at a predetermined low working speed.

16. In a machine tool, in combination, hydraulic speed control apparatus comprising two operating units, one operating unit including a first fluid operated member, and a holder for a tool or workpiece carried by the same; and the other operating unit including a second fluid operated member for moving said one operating unit; two control units, each control unit including a cylinder member, a piston member forming in the same first and second control chambers, one of said members being movable relative to the other member, stop means for limiting the stroke of said movable member into said second chamber, and inlet means and outlet means for a fluid connected with said first control chamber; two first conduit means respectively connecting said first control chambers with said operating units, each first conduit means including closure means responsive to a predetermined pressure to open said first conduit means, and means for limiting the rate of flow of fluid in said first conduit means; and two second conduit means respectively connecting said second control chambers of said operating units so that fluid supplied from said inlet means into said first control chambers rapidly moves said movable members, respectively, to press fluid from said second control chambers into said operating units, respectively, whereby said first fluid operated member and said holder rapidly move a workpiece or tool, and said second fluid operating member rapidly moves said first operating unit, while after stopping of said movable members by said stop means the pressure increases in said first conduit means above said predetermined pressure so that fluid flows at a predetermined rate of flow into said operating units to move said fluid operated members, said first operating unit and said holder with a workpiece or tool at a predetermined low working speed.

17. In a machine tool, in combination, hydraulic speed control apparatus comprising two operating units, one operating unit including a first fluid operated member, and a holder for a tool or workpiece carried by the same, and the other operating unit including a second fluid operated member for moving said one operating unit; two control units, each control unit including a cylinder member, a piston member forming in the same first and second control chambers, one of said members being movable relative to the other member, stop means for limiting the stroke of said movable member into said second chamber, inlet means and outlet means for a fluid, and valve means movable between two positions for connecting said inlet means and outlet means, respectively, with said first control chamber; two actuating means operating in synchronism with said machine tool for moving said valve means of said two control units, respectively, from one position to the other position thereof; two first conduit means respectively connecting said first control chambers with said operating units, each first conduit means including spring-loaded check valve means responsive to a predetermined pressure to open said first conduit means, and means for limiting the rate of flow of fluid in said first conduit means; and two second conduit means respectively connecting said second control chambers with said operating units so that fluid supplied under the control of said actuating means and valve means, respectively, from said inlet means into said first control chambers rapidly moves said movable members, respectively, to press fluid from said second control chambers into said operating units, respectively, whereby said first fluid operated member and said holder rapidly move a workpiece or tool, and said second fluid operating member rapidly moves said first operating unit, while after stopping of said movable members by said stop means the pressure increases in said first conduit means above said predetermined pressure so that fluid flows at a predetermined rate of flow into said operating units to move said fluid operated members, said first operating unit and said holder with a workpiece or tool at a predetermined low working speed.

18. An apparatus as set forth in claim 17 and including hydraulic return means in said control units, respectively, for returning said valve means from said other position to said one position, and conduit means connecting said return means of each control unit with the second conduit means which connects the respective other control unit with the operating unit associated therewith.

19. In a machine tool, in combination, hydraulic speed control apparatus comprising an operating unit including an operating cylinder, a fluid-operated member in said cylinder, and a holder for a tool or workpiece carried by said member; a control unit including a cylinder chamber, a control piston movable in said cylinder chamber and forming in the same first and second control chambers, and adjustable stop means in said second control chamber for limiting the stroke of said control piston into said second chamber, inlet means and outlet means for fluid, and first valve means for respectively connecting said inlet means and outlet means with said first control chamber; first actuating means operating in synchronism with said machine tool for operating said first valve means; first conduit means connecting said first control chamber with said cylinder and including a spring-loaded check valve responsive to a predetermined pressure to open said first conduit means for flow toward said cylinder, and adjustable means for limiting the rate of flow of fluid in said first conduit means; second conduit means connecting said second control chamber with said operating cylinder so that fluid supplied in a first position of said valve means into said first control chamber rapidly moves said control piston to press fluid from said second control chamber into said operating cylinder whereby said fluid operated member and said holder rapidly moves a tool or workpiece, while after stopping of said control piston by said stop means the pressure increases in said first conduit means above said predetermined pressure so that fluid flows at a predetermined rate of flow into said operating cylinder whereby said tool or workpiece is moved at a predetermined low working speed; an operating cylinder and an operating piston forming in the same two spaces; second valve means movable between two positions for supplying and discharging, respectively, fluid to and from said spaces; and second actuating means operating in synchronism with said machine tool for operating said second valve means so that said operating piston is adapted to move a machine element in time relation with said fluid-operated member.

20. An apparatus as set forth in claim 19 and including hydraulically operated spring-loaded return means for said first and second valve means connected with said second conduit means for shifting said valve means when the pressure in said operating cylinder exceeds a given limit.

References Cited by the Examiner

UNITED STATES PATENTS

| | | | |
|---|---|---|---|
| 2,127,877 | 8/1938 | Maglott | 60—52 X |
| 2,361,460 | 10/1944 | Daugherty | 60—53 X |
| 2,567,670 | 9/1951 | Iversen et al. | 60—52 X |
| 2,613,703 | 10/1952 | Calvert | 60—52 X |

FOREIGN PATENTS 154,542 12/1953 Australia.

EDGAR W. GEOGHEGAN, *Primary Examiner.*